United States Patent
Stoudt, Jr. et al.

(10) Patent No.: US 6,773,055 B1
(45) Date of Patent: Aug. 10, 2004

(54) VEHICLE DOORFRAME MOUNTABLE ARMREST

(76) Inventors: James F. Stoudt, Jr., 2632 Ironville Pike, Columbia, PA (US) 17512; James F. Stoudt, Sr., 2632 Ironville Pike, Columbia, PA (US) 17512

( * ) Notice: Subject to any disclaimer, the term of this patent is extended or adjusted under 35 U.S.C. 154(b) by 0 days.

(21) Appl. No.: 10/369,457

(22) Filed: Feb. 20, 2003

(51) Int. Cl.[7] ................................................ B60N 3/10
(52) U.S. Cl. ........................ 296/153; 296/1.09; 224/926
(58) Field of Search ................................ 296/153, 1.02, 296/1.09, 146.7, 146.5; 224/926; 297/115, 227, 411.21, 411.22

(56) References Cited

U.S. PATENT DOCUMENTS

| | | | | |
|---|---|---|---|---|
| 1,650,385 A | * | 11/1927 | Payton | 296/153 |
| 1,715,862 A | * | 6/1929 | Payton | 297/411.22 |
| 1,742,447 A | * | 1/1930 | McKeag | 296/153 |
| 2,305,871 A | * | 12/1942 | Hathaway | 297/411.21 |
| 4,226,464 A | * | 10/1980 | Janz et al. | 296/153 |
| 4,890,878 A | * | 1/1990 | Harary et al. | 296/153 |
| 5,180,089 A | * | 1/1993 | Suman et al. | 224/547 |
| 5,203,604 A | * | 4/1993 | Emley, Jr. | 296/153 |
| 5,964,497 A | * | 10/1999 | Wiles | 296/153 |
| 6,036,255 A | * | 3/2000 | Lester et al. | 296/146.1 |
| 6,059,238 A | * | 5/2000 | Reynolds et al. | 248/118 |
| 6,248,205 B1 | * | 6/2001 | Scheidmantel et al. | 156/309.6 |

* cited by examiner

*Primary Examiner*—D. Glenn Dayoan
*Assistant Examiner*—Greg Blankenship

(57) ABSTRACT

Vehicle doorframe mountable armrests provide an armrest for a vehicle with two-piece doors. A bar with L-shaped ends is adapted to fit into the existing receiving holes present in the bottom half of a two-piece vehicle door. A pad covers the middle of the bar to provide a comfortable cushion for the arm of a vehicle's occupant. Optionally, a clamp may be employed to removably connect the bar to the doorframe members present in the bottom half of the two-piece vehicle door. A swivelable cupholder is removably connected to the second bar. The bar is painted to match the vehicle's interior.

6 Claims, 2 Drawing Sheets

VEHICLE DOORFRAME MOUNTABLE ARMREST

BACKGROUND OF THE INVENTION

1. Field of the Invention

The present invention relates to a vehicle doorframe mountable armrest for use in connection with vehicles. The vehicle doorframe mountable armrest has particular utility in connection with providing an armrest for a vehicle with two-piece doors.

2. Description of the Prior Art

Vehicle doorframe mountable armrests are desirable for providing an armrest for a vehicle with two-piece doors. Driving or riding in a vehicle for long periods of time can cause the occupant's arms to fatigue when they are left dangling unsupported. Unfortunately, many vehicles having two-piece doors do not have armrests built in. Vehicle doorframe mountable armrests overcome this deficiency by providing an armrest that is easily installed on the bottom half of a two-piece door when the top half of the two-piece door is not needed. Optional padding and a swivelable cupholder further increase the utility of the vehicle doorframe mountable armrest. Moreover, the vehicle doorframe mountable armrest can be produced in a variety of colors to match the interior of the vehicle in which it is installed.

The use of adjustable armrests for installation in a vehicle is known in the prior art. For example, U.S. Pat. No. 5,964,497 to Wiles discloses an adjustable armrest for installation in a vehicle. However, the Wiles '497 patent does not have a swivelable cupholder, and has further drawbacks of lacking opposing ends that are adapted to fit into receiving holes present in the top of the bottom half of a two-piece vehicle door.

U.S. Pat. No. 5,893,601 to Carlberg discloses a vehicle door top armrest that provides a place for comfortable placement of a driver's arm. However, the Carlberg '601 patent does not have a cupholder, and additionally does not have opposing ends that are adapted to fit into receiving holes present in the top of the bottom half of a two-piece vehicle door.

Similarly, U.S. Pat. No. 1,650,385 to Payton discloses an arm rest that supports the arm of an occupant of a vehicle. However, the Payton '385 patent does not have a cupholder, and lacks opposing ends that are adapted to fit into receiving holes present in the top of the bottom half of a two-piece vehicle door.

In addition, U.S. Pat. No. 6,120,088 to Terranova discloses a car arm restor that rests the arm of persons within most vehicles. However, the Terranova '088 patent does not have a swivelable cupholder, and also does not have opposing ends that are adapted to fit into receiving holes present in the top of the bottom half of a two-piece vehicle door.

Furthermore, U.S. Pat. No. Des. 390,530 to Robinson discloses a detachable arm rest for motor vehicles that supports the arm of an occupant of a motor vehicle. However, the Robinson '530 patent does not have a cupholder, and further lacks opposing ends that are adapted to fit into receiving holes present in the top of the bottom half of a two-piece vehicle door.

U.S. Pat. No. Re. 36,059 to Thomas discloses an adjustable window mounting vehicle accessory that provides comfort and support as an arm rest. However, the Thomas '059 patent does not have a swivelable cupholder, and has the additional deficiency of lacking opposing ends that are adapted to fit into receiving holes present in the top of the bottom half of a two-piece vehicle door.

Lastly, U.S. Pat. No. 5,320,401 to Ott discloses a vehicle arm rest that can be easily adjusted to make the height of the arm rest convenient for the user-occupant. However, the Ott '401 patent does not have a cupholder, and further lacks opposing ends that are adapted to fit into receiving holes present in the top of the bottom half of a two-piece vehicle door.

While the above-described devices fulfill their respective, particular objectives and requirements, the aforementioned patents do not describe a vehicle doorframe mountable armrest that allows providing an armrest for a vehicle with two-piece doors. The above patents make no provision for opposing ends that are adapted to fit into receiving holes present in the top of the bottom half of a two-piece vehicle door. The Wiles '497 patent, the Terranova '088 patent, and the Thomas '059 patent lack a swivelable cupholder. The Carlberg '601 patent, the Payton '385 patent, the Robinson '530 patent, and the Ott '401 patent do not have a cupholder.

Therefore, a need exists for a new and improved vehicle doorframe mountable armrest that can be used for providing an armrest for a vehicle with two-piece doors. In this regard, the present invention substantially fulfills this need. In this respect, the vehicle doorframe mountable armrest according to the present invention substantially departs from the conventional concepts and designs of the prior art, and in doing so provides an apparatus primarily developed for the purpose of providing an armrest for a vehicle with two-piece doors.

SUMMARY OF THE INVENTION

In view of the foregoing disadvantages inherent in the known types of adjustable armrests for installation in a vehicle now present in the prior art, the present invention provides an improved vehicle doorframe mountable armrest, and overcomes the above-mentioned disadvantages and drawbacks of the prior art. As such, the general purpose of the present invention, which will be described subsequently in greater detail, is to provide a new and improved vehicle doorframe mountable armrest which has all the advantages of the prior art mentioned heretofore and many novel features that result in a vehicle doorframe mountable armrest which is not anticipated, rendered obvious, suggested, or even implied by the prior art, either alone or in any combination thereof.

To attain this, the present invention essentially comprises a plurality of second bars having opposing ends with one end attached to the opposing ends of a first bar. A plurality of third bars have one end attached to the opposing end of the second bars. The second bars are at a right angle to the first bar with a horizontal orientation, and the third bars are at a right angle to the second bars with a vertical orientation.

There has thus been outlined, rather broadly, the more important features of the invention in order that the detailed description thereof that follows may be better understood and in order that the present contribution to the art may be better appreciated.

The invention may also include a pad enclosing the first bar. There may be a plurality of clamps removably connected to the opposing end of the third bars. A cupholder may be removably connected to one of the second bars. The cupholder may comprise a mounting clamp with a cup-receiving ring attached to one end. The first bar, second bars, and third bars may be made of plastic, steel, aluminum, titanium, wood, or carbon fiber composite. The pad may be made of plastic, rubber, or neoprene. The opposing ends of the third bars may be adapted to fit in receptacles for an upper half of a two-piece vehicle door. The first bar may have a length of about 13½ inches. The second bars and third bars may have a length of about 3 inches. The invention may be a single bar with its opposing ends having a horizontal, right angle band and then a vertical, right angle bend. The bar may have a diameter of about ⅜ of an inch. The bar may be painted. There may be a pad enclosing the middle of the bar. The cupholder may comprise a mounting clamp with a screw hole in one end and a cup-receiving ring swivelably attached to its opposing end. There may be a screw removably threadedly inserted into the screw hole. The clamp may comprise a clamp body with a doorframe member hole in one end and a sleeve insert hole in its opposing end. A hollow sleeve insert maybe removably inserted into the sleeve insert hole, and a securing screw may be removably threadedly inserted into the clamp body. The invention may comprise an improvement to the bottom half of a two-piece vehicle door. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle doorframe mountable armrest that has all of the advantages of the prior art adjustable armrests for installation in a vehicle and none of the disadvantages.

It is another object of the present invention to provide a new and improved vehicle doorframe mountable armrest that may be easily and efficiently manufactured and marketed.

An even further object of the present invention is to provide a new and improved vehicle doorframe mountable armrest that has a low cost of manufacture with regard to both materials and labor, and which accordingly is then susceptible of low prices of sale to the consuming public, thereby making such vehicle doorframe mountable armrest economically available to the buying public.

Still another object of the present invention is to provide a new vehicle doorframe mountable armrest that provides in the apparatuses and methods of the prior art some of the advantages thereof, while simultaneously overcoming some of the disadvantages normally associated therewith.

Even still another object of the present invention is to provide a vehicle doorframe mountable armrest for providing an armrest for a vehicle with two-piece doors. This allows the vehicle doorframe mountable armrest to removably attach to the receptacles present in the bottom half of a two-piece door.

Still yet another object of the present invention is to provide a vehicle doorframe mountable armrest for providing an armrest for a vehicle with two-piece doors. This makes it possible to attach the vehicle doorframe mountable armrest to doorframe members.

An additional object of the present invention is to provide a vehicle doorframe mountable armrest for providing an armrest for a vehicle with two-piece doors. This provides a comfortable support for a driver or passenger's arm.

A further object of the present invention is to provide a vehicle doorframe mountable armrest for providing an armrest for a vehicle with two-piece doors. This reduces the chance of a cup spilling when it is held by the cupholder.

A still further object of the present invention is to provide a vehicle doorframe mountable armrest for providing an armrest for a vehicle with two-piece doors. This allows the user to remove the cupholder when it is not needed.

Lastly, it is an object of the present invention to provide a new and improved vehicle doorframe mountable armrest for providing an armrest for a vehicle with two-piece doors.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figures 1, 2:
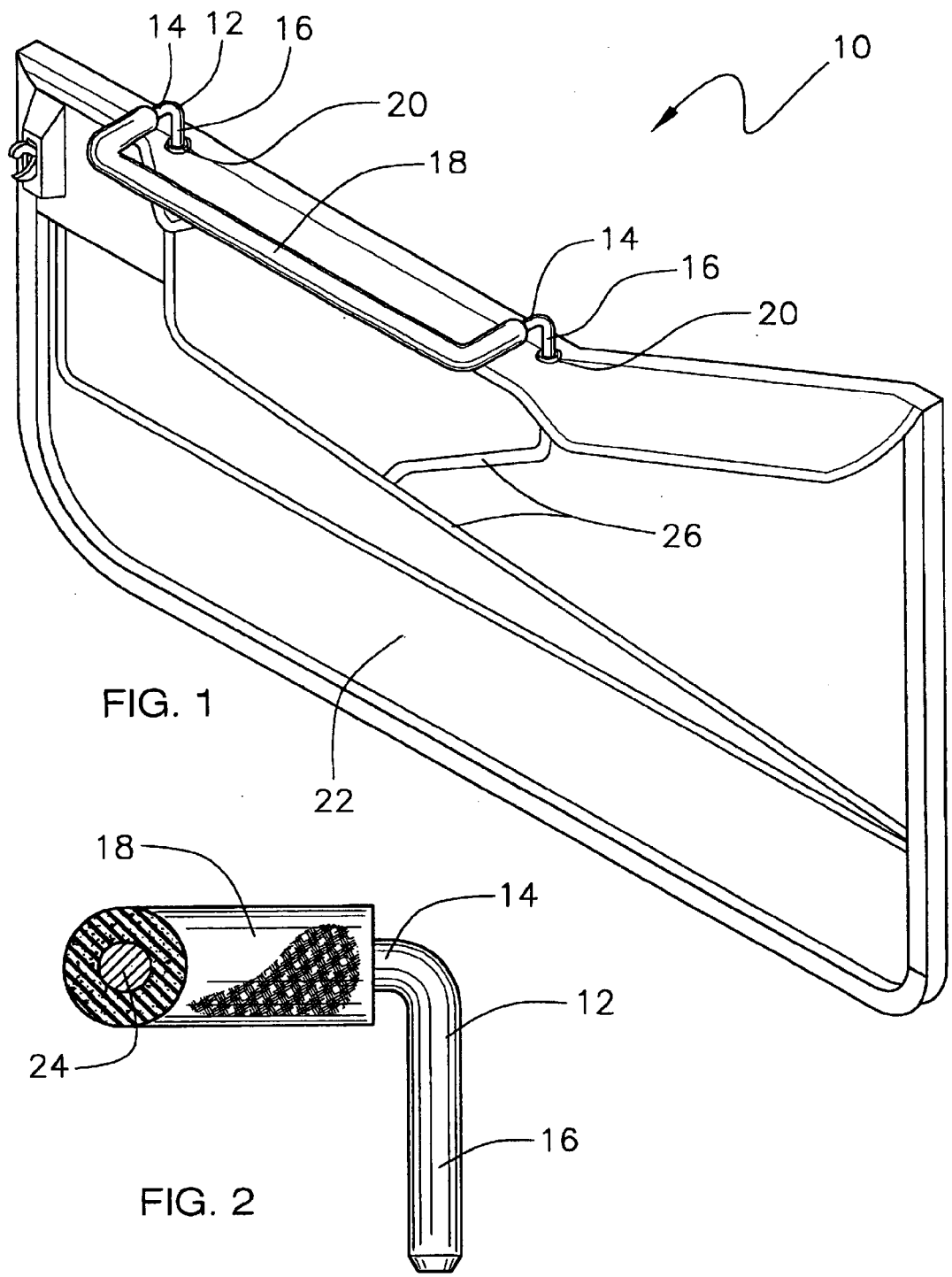
FIG. 1 is a top perspective view of the current embodiment of the vehicle doorframe mountable armrest constructed in accordance with the principles of the present invention.
FIG. 2 is a side sectional view of the bar of the present invention.

Referring now to the drawings, and particularly to FIGS. 1–4, a current embodiment of the vehicle doorframe mountable armrest of the present invention is shown and generally designated by the reference numeral 10.

In FIG. 1, a new and improved vehicle doorframe mountable armrest 10 of the present invention for providing an armrest for a vehicle with two-piece doors is illustrated and will be described. More particularly, the vehicle doorframe mountable armrest 10 has first bar 24 (not visible because it is covered by pad 18), second bars 14, and third bars 16 comprising a bar 12. In the current embodiment, bar 12 is a continuous piece of aluminum and is bent so that second bars 14 are at a right angle to first bar 24 in a horizontal orientation and third bars 16 are at a right angle to second bars 14 in a vertical orientation. Essentially, second bars 14 and third bars 16 combine to form an L-shape. Third bars 16 are adapted to fit into receiving holes 20 of a bottom half of a two-piece vehicle door 22. The bottom half of a two-piece vehicle door 22 has doorframe members 26. In the current embodiment, first bar 24, second bars 14, and third bars 16 have a diameter of ⅜ of an inch. First bar 24 has a length of 13½ inches, and second bars 14 and third bars 16 have a length of three inches. Pad 18 provides a comfortable surface for the user (not shown) to rest their arm against, and is made of neoprene in the current embodiment. Note that the bottom half of a two-piece vehicle door 22 and the doorframe members 26 are for illustrative purposes only and are not part of the current invention.

Moving on to FIG. 2, a new and improved bar 12 of the present invention for providing an armrest for a vehicle with two-piece doors is illustrated and will be described. More particularly, the bar 12 has one end of a first bar 24 connected to one end of a second bar. The second bar 14 has one end of a third bar 16 connected at its opposing end. First bar 24, second bar 14, and third bar 16 are all perpendicular to one another with second bar 14 having a horizontal orientation and third bar 16 having a vertical orientation with respect to first bar 24. A pad 18 encloses first bar 24 and second bar 14. The opposing end of third bar 16 is adapted to fit the receiving hole 20 (not shown) of the bottom half of a two-piece vehicle door 22 (not shown).

Figure 3:
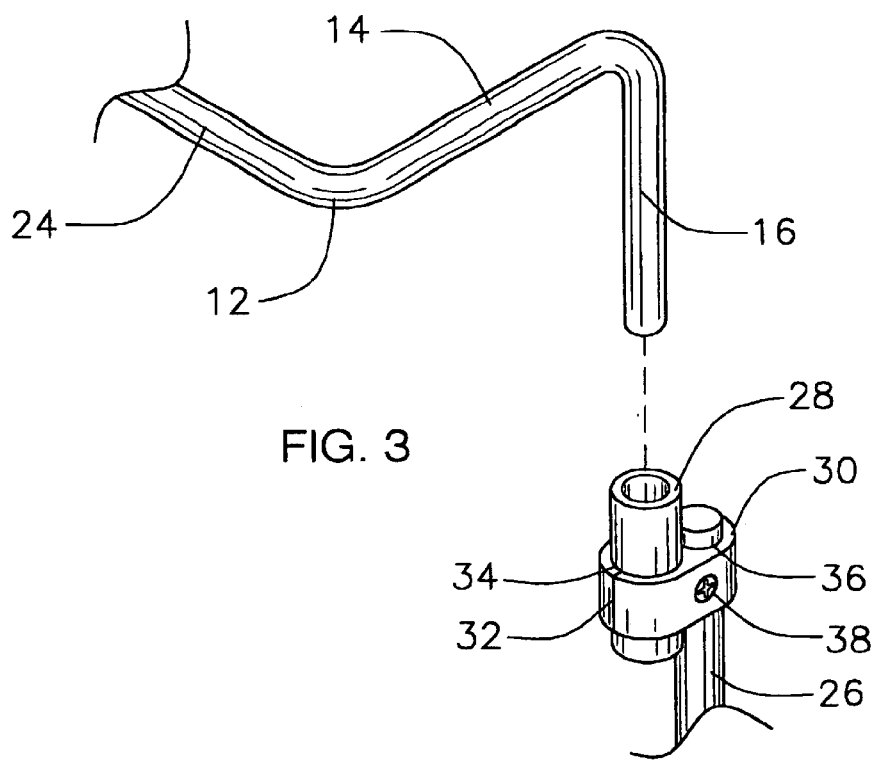
FIG. 3 is a top perspective view of the clamp of the present invention.

Continuing with FIG. 3, a new and improved clamp 30 of the present invention for providing an armrest for a vehicle with two-piece doors is illustrated and will be described. More particularly, the clamp 30 has a clamp body 32 with a sleeve insert hole 34 in one end and a doorframe member hole 36 in its opposing end. When securing screw 38 is removed from clam body 32, doorframe member 26 can be inserted into doorframe member hole 36, and sleeve insert 28 can be inserted into sleeve insert hole 34. Securing screw 38 is tightened to hold doorframe member hole 36 and sleeve insert 28 in place within clamp body 32. The opposing end of the third bar 16 can be inserted into the sleeve insert hole 34 to removably attach bar 12 to the doorframe member 26 for a more secure attachment than is possible by simply inserting third bar 16 into receiving hole 20 (not shown). A second bar 14 and a portion of the first bar 24 are also shown. Note that the doorframe member 26 is for illustrative purposes only and is not part of the current invention.

Figure 4:
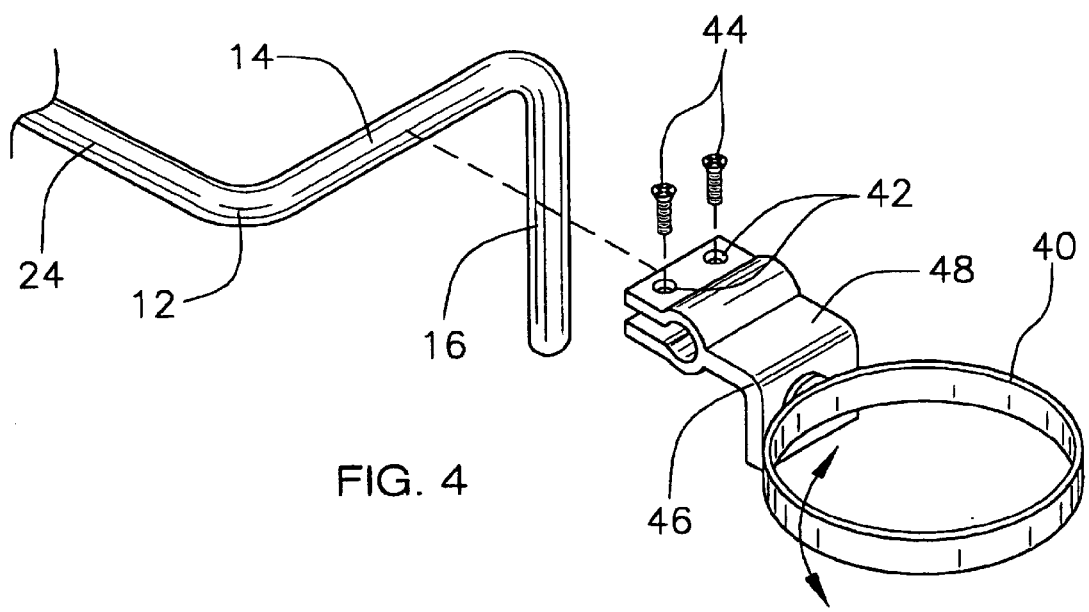
FIG. 4 is a top perspective view of the cupholder of the present invention.

Concluding with FIG. 4, a new and improved cupholder 46 of the present invention for providing an armrest for a vehicle with two-piece doors is illustrated and will be described. More particularly, the cupholder 46 has a mounting clamp 48 with screw holes 42 in one end. A cup-receiving ring 40 is swivelably mounted on the opposing end of the mounting clamp 48. The mounting clamp 48 is adapted to fit over second bar 14, and screws 44 are threadedly inserted into screw holes 42 to hold the mounting clamp 48 in place. The swivelably mounted nature of cup-receiving ring 40 is denoted by the doubleheader arrows. Because cup-receiving ring 40 can swivel, a cup (not shown) held by cup-receiving ring 40 has a reduced chance of spilling because cup-receiving ring 40 will swivel to maintain the cup in a vertical orientation. A third bar 16 and a portion of the first bar 24 of bar 12 are also shown.

In use, it can now be understood that the prior to the installation of the vehicle doorframe mountable armrest 10, the user removes the top half of the two-piece door from the bottom half. Depending on the nature of the two-piece door and the degree of security of attachment desired by the user, the user either simply inserts the third bars 16 into receiving holes 20, or attaches clamps 30 to doorframe members 26 and then inserts third bars 16 into sleeve inserts 28. If desired, the user attaches cupholder 46 to one of the second bars 14 by inserting the second bar 14 into the mounting clamp 48 and tightening screws 44 to hold the mounting clamp 48 in place. The user can place a cup into the cup-receiving ring 40 to be held securely. The user can rest his or her arm on the pad 18 as desired. When the vehicle doorframe mountable armrest 10 is no longer needed, the user simply pulls third bars 16 out o fthe receving holes 20 or the sleeve inserts 28, depending on which was used initially. The clamps 30 can be removed from the doorframe members 26 if necessary by loosening securing screws 38. The user can also remove the cupholder 46 at any time from the second bar 14.

While a current embodiment of the vehicle doorframe mountable armrest has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, steel, titanium, wood, or carbon fiber composite may be used instead of the aluminum bar described. And although providing an armrest for a vehicle with two-piece doors has been described, it should be appreciated that the vehicle doorframe mountable armrest is also suitable for use with other types of vehicle doors having either receiving holes in their tops and/or accessible doorframe members. Also, the neoprene pad may also be made of plastic or rubber. Furthermore, a wide variety of bar shapes may be used instead of the L-shaped ends described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vehicle doorframe mountable armrest comprising:
   a first bar having opposing ends;
   a plurality of second bars having oppssing ends with one end attached to said opposing ends of said first bar such that said second bars are at a right angle to said first bar in a horizontal orientation;
   a cupholder removably connected to one of said second bars; and
   a plurality of third bars having opposing ends with one end attached to said opposing ends of said second bars such that said third bars are at a right angle to said second bars in a vertical orientation.

2. The vehicle doorframe mountable armrest as defined in claim 1, wherein said cuphoder comprises:
- a mounting clamp having opposing ends; and
- a cup-receiving ring connected to said end of said mounting clamp.

3. A vehicle doorframe mountable armrest comprising:
- a bar having opposing ends and a middle, with said opposing ends having a horizontal, right amgle bend and then a vetical, right angle bend; and
- acupholder connected to one of said ends of said bar.

4. The vehicle doorframe mountable armrest as defined in claim 3, wherein said cupholder comprises:
- mounting clamp having opposing ends;
- a screw hole wherein one of said ends of said mounting clamp defines a hole therein to comprise said screw hole;
- a screw removably threadedly inseted into said screw hole; and
- a cup-receiving ring swivelably attached to the the other of said opposing ends of said mouting clamps.

5. A vehicle doorframe mountable armrest comprising:
- a bar having opposing ends and a middle, with said opposing ends having a horizontal right angle bend and then a vertical, right angle bend; and
- a plurality of clamps removably connected to said opposing ends of said bar;
- wherein each said clamp comprises:
  - a clamp body having opposing ends;
  - a doorframe member hole wherein one of said ends of said clamp body defines a hole therein to comprise said frame member hole;
  - a sleeve insert hole wherein the other of said opposing end of said clamp body defines a hole therein to comprise said sleeve insert hole;
  - a hollow sleeve insert removably inserted into said sleeve insert hole; and
  - a securing screw removably threadedly inserted into said clamp body.

6. In combination with the bottom half of a two-piece vehicle door, including a top with receiving holes, the improvement which comprises:
- a bar having opposing ends, an exterior, and a middle, and said opposing ends having a horizontal, right angle bend and then a vertical, right angle bend, with said opposing ends removably inserted into said receiving holes of said bottom half of a two-piece vehicle door;
- a coating of paint applied to said exterior of said bar;
- a pad enclosing said coating of paint;
- further comprising:
- a cupholder removably connected to one of said ends of said bar; and
- a plurality of clamps removably connected to the other of said ends of said bar.

* * * * *